(12) United States Patent
Voβ et al.

(10) Patent No.: US 8,574,344 B2
(45) Date of Patent: Nov. 5, 2013

(54) TEMPLATE-FREE CLATHRASILS AND CLATHRASIL MEMBRANES

(75) Inventors: Hartwig Voβ, Frankenthal (DE); Jörg Therre, Worms (DE); Hermann Gies, Sprockhövel (DE); Bernd Marler, Gevelsberg (DE)

(73) Assignee: BASF SE, Ludwigshafen (DE)

( * ) Notice: Subject to any disclaimer, the term of this patent is extended or adjusted under 35 U.S.C. 154(b) by 275 days.

(21) Appl. No.: 13/121,839

(22) PCT Filed: Sep. 28, 2009

(86) PCT No.: PCT/EP2009/062479
§ 371 (c)(1),
(2), (4) Date: Mar. 30, 2011

(87) PCT Pub. No.: WO2010/037690
PCT Pub. Date: Apr. 8, 2010

(65) Prior Publication Data
US 2011/0197762 A1    Aug. 18, 2011

(30) Foreign Application Priority Data
Oct. 2, 2008 (EP) .................... 08165789

(51) Int. Cl.
*B01D 53/22* (2006.01)
*B01D 71/02* (2006.01)
*C01B 33/12* (2006.01)
*C01B 37/02* (2006.01)

(52) U.S. Cl.
USPC .............. 95/45; 95/52; 95/53; 95/55; 96/4; 96/11; 423/709; 423/716; 423/335; 502/4; 428/402; 117/72

(58) Field of Classification Search
USPC ............ 95/45, 52, 53, 55; 96/4, 11; 423/700, 423/709, 716, 335; 502/4, 60, 64; 428/402; 117/72
See application file for complete search history.

(56) References Cited

U.S. PATENT DOCUMENTS

| | | | | |
|---|---|---|---|---|
| 5,368,836 A | * | 11/1994 | Grebner et al. | ............... 423/706 |
| 5,435,988 A | * | 7/1995 | Grebner et al. | ............... 423/706 |
| 7,014,680 B2 | * | 3/2006 | Nakayama et al. | ............... 95/51 |
| 2010/0119442 A1 | | 5/2010 | Mueller et al. | |

FOREIGN PATENT DOCUMENTS

| EP | 1 894 613 A1 * | 3/2008 | ............ B01D 71/02 |
|---|---|---|---|
| EP | 1894613 | 3/2008 | |

OTHER PUBLICATIONS

"Ein neuer Schichtsilicatstrukturtyp: der Zeolithvorlaufer RUB-15: [N(CH3)4]8[Si24O52(OH)4] 20H20", Oberhagemann, Uwe et al., Angew. Chem., 108, Nr 23/24, 1996, pp. 3041-3044.*

(Continued)

*Primary Examiner* — Jason M Greene
(74) *Attorney, Agent, or Firm* — Servilla Whitney LLC (57) ABSTRACT

The present invention relates to template-free clathrasils whose framework comprises essentially $SiO_2$, wherein the crystals of the clathrasils have the platelet-like morphology of a sheet silicate. The present invention further relates to a process for preparing these template-free clathrasils and also to their use as absorbent, as seed crystals for the synthesis of clathrasil membranes of the same zeolite type and in the form of dense layers which function as gas separation membranes having a molecular sieving action.

16 Claims, 8 Drawing Sheets

(56) References Cited

OTHER PUBLICATIONS

"Formation of Clathrasil Layers by Secondary Growth of DOH-type Nuclei for Gas Separation Applications", van der Donk, Geroge et al., Microporous and Mesoporous Materials, 115, 2008, pp. 3-10.*

Oberhagemann, Uwe et al., "Ein neuer Schichtsilicatstrukturtyp: der Zeolithvorlaufer RUB-15 [N(CH$_3$)$_4$]$_8$[Si$_{24}$O$_{52}$(OH)$_4$]—20H$_2$O)", Angew. Chem., 108, Nr. 23/24 1996, 4 pgs.

Van Der Donk, George et al., "Formation of clathrasil layers by secondary growth of DOH-type nuclei for gas separation applications", *Microporous and Mesoporous Materials* 115 2008, 3-10.

IPRP in PCT/EP2009/062479, mailed Apr. 5, 2011, 9 pgs.

Caro, J. et al., "Zeolite membranes—state of their development and perspective", *Microporous and Mesoporous Materials* 38 2000, 3-24.

Caro, Juergen et al., "Zeolite membranes—Recent developments and progress", *Microporous and Mesoporous Materials* 115 2008, 215-233.

Dincer, Eser et al., "Effect of seeding on the properties of MFI type zeolite membranes", *Desalination 200* 2006, 66-67.

Ikeda, T. et al., "Crystal Structure of a Helix Layered Silicate Containing Tetramethylammonium Ions in Sodalite-Like Cages", *Chem. Mater.*, 13 2001, 1286-1295.

Li, Zhaofei et al., "A New Layered Silicate with Structural Motives of Silicate Zeolites: Synthesis, Crystals Structure, and Properties", *Chem. Mater.*, 20 2008, 1896-1901.

Marler, B. et al., "The structure of the new pure silica zeolite RUB-24, Si$_{32}$O$_{64}$, obtained by topotactic condensation of the intercalated layer silicate RUB-18", *Microporous and Mesoporous Materials 83* 2005, 201-211.

Munzer, Simon et al., "Preparation and characterization of sodium-free nanocrystalline sodalite", *Microporous and Mesoporous Materials 110* 2008, 3-10.

Oumi, Yasunori et al., "Convenient conversion of crystalline layered silicate octosilicate into RWR-type zeolite by acetic acid intercalation", *New Journal of Chemistry*, 31 2007, 593-597.

* cited by examiner

TEMPLATE-FREE CLATHRASILS AND CLATHRASIL MEMBRANES

TECHNICAL FIELD

The present invention relates to template-free clathrasils whose framework comprises essentially $SiO_2$, wherein the crystals of the clathrasils have the platelet-like morphology of a sheet silicate. The present invention further relates to a process for preparing these template-free clathrasils and also to their use as absorbent, as seed crystals for the synthesis of clathrasil membranes of the same zeolite type and in the form of dense layers which function as gas separation membranes having a molecular sieving action.

BACKGROUND

The use of membranes for separating various components of gas mixtures is generally known. Membranes have been used in order to separate, to remove, to purify or partially to recover many gases.

The separation of hydrogen from hydrogen-comprising hydrocarbon mixtures or from carbon monoxide and/or carbon dioxide is of particular interest at present. For example, such a separation is required in the preparation of propene from propane (dehydrogenation), of synthesis gas (adjustment of the $H_2/CO$ ratio) or of hydrogen via the water gas shift reaction (reaction of CO with water to form $CO_2$ and $H_2$). In the prior art, predominantly polymer membranes are used for separating hydrogen and/or water. For example, WO 08/46880 describes the use of polyimide membranes. The polymer membranes can generally be used at a temperature of from 20 to 80° C., in some cases up to 120° C. However, since the hydrogen-comprising gas mixtures are obtained at high temperatures of from 200 to 600° C. in most industrial processes, they have to be cooled before contact with the polymer membrane. This cooling represents a complicated and costly process step.

There is therefore a great need for membranes which can separate hydrogen from hydrogen-comprising mixtures in gas or vapor form at elevated temperatures.

Zeolites which are low in aluminum or comprise essentially only $SiO_2$ are generally known as thermally stable materials to those skilled in the art. The advantage of zeolites is that they have a crystalline structure and a defined pore size. Owing to their specific topology, zeolites can accordingly be used for separation applications by means of molecular sieving, i.e. molecules having a kinetic diameter which is smaller than or similar to the diameter of the largest zeolite pores can penetrate into the framework structure and are adsorbed or, as a result of a driving force, transported through the framework structure, while larger molecules are shut out or held back. The gas or vapor molecules present in the mixture which can be separated by the principle of molecular sieving are therefore fixed for a given zeolite framework type which defines the topology of the framework and pore structure.

The prior art describes, for example, zeolite membranes of the pure silica MFI type (MFI has 10-membered rings; e.g. Kalipcilar et al.: effect of seeding on the properties of MFI type zeolite membranes; Desalination 200 (2006) 66-67) or DDR type (DDR has 8-membered rings, NGK Insulators: porous structure with seed crystal-containing layer for manufacturing zeolite membrane and method for manufacturing zeolite membrane, EP 1894613); these zeolites have pore diameters of >0.35 nm and thus do not have a pore size in the region of the gas diameter of hydrogen.

The zeolite membranes described in the prior art are usually produced by the "secondary growth" method (see, for example, van der Donk et al. in Microporous and Mesoporous Materials 115 (2008) 3-10). Here, seed crystals are applied to a porous inorganic support which may be metallic or ceramic in nature by filtering on or by attachment using polymeric quaternary ammonium compounds and subsequently fixed by sintering. After sintering, the rear side of the future zeolite membrane is covered so as to make it impervious to liquid and the support is introduced into a synthesis solution comprising water, organic structure formers (templates) such as tetrapropylammonium hydroxide, 1-aminoadamantane or quinuclidine, an $SiO_2$ source such as TEOS (tetraethyl orthosilicate) or silica sols (dissolved polysilicic acids or dispersions of amorphous silicon dioxide) and, optionally, inorganic auxiliaries such as bases, salts, etc. The hydrothermal crystallization of a dense zeolite layer onto the support is then carried out in the synthesis solution at temperatures of from 80 to 180° C. A good overview on the subject of zeolite membranes and the synthesis of zeolite membranes is given by, for example, Caro et al. in Microporous and Mesoporous Materials 115 (2008) 215-233 (zeolite membranes—recent developments and progress).

Clathrasils, on the other hand, whose framework comprises essentially $SiO_2$ and no further metals such as Al are, owing to the framework structure which has a 6-membered ring pore system having a (temperature-dependent) pore diameter of about 0.25-0.27 nm, are mainly suitable in processes of gas separation, vapor permeation or pervaporation for separating small molecules such as hydrogen (kinetic gas diameter of 0.289 nm), helium (kinetic gas diameter of 0.255 nm) or water (kinetic gas diameter of 0.290 nm) by the principle of molecular sieving from larger gas molecules such as CO, $CO_2$, $CH_4$ and higher aliphatic or aromatic hydrocarbons (kinetic gas diameter of >0.3 nm) on the basis of the size difference. In this context, the clathrasils of the framework type SOD, AST and SOT are of particular interest since these have the highest density of 6-membered rings and a 3-dimensional pore system.

However, the prior art gives no information as to how a clathrasil membrane is to be produced. For example, Münzer et al, (Microporous and Mesoporous Materials 110 (2008) 3-10) discloses that no success was achieved in producing suitable seed crystals from a pure silica SOD zeolite by means of various organic compounds as structure-directing reagents (templates) for the secondary growth method. It was only possible to produce a small amount of nanocrystals which was obtained together with a large number of large particles and unreacted amorphous material. Furthermore, the nanocrystals could be isolated only with great difficulty. As a result, the production of a clathrasil membrane has hitherto foundered on the provision of clathrasil seed crystals.

Likewise, van der Dank et al. (Microporous and Mesoporous Materials 115 (2008) 3-10) have not succeeded in preparing selectively separating D1H membranes (D1H is the pure silica variant of the 6-membered ring structure type DOH). Although virtually template-free crystals could be produced by milling larger crystals and heating in air at elevated pressure and a temperature of 900° C., this was with some loss of crystallinity. However, the layers produced by the secondary growth method on an aluminum oxide support did not display a closed layer after template removal for 5 hours at 700° C. but instead displayed intercrystalline holes and partial detachment and are thus unsuitable as gas separation membranes. Whether the partially intact regions of the D1H layer were template-free is not disclosed.

The crystal geometry of the SOD clathrasil known in the prior art is cubic; the crystals therefore predominantly have a cubic, octahedral or rhombododecahedral morphology. Münzer et al. discloses, for example, the tetramethylammonium AlSi SOD in cube form (Microporous and Mesoporous Materials 110 (2008) 3-10, FIG. 3). AST is likewise cubic and displays the octahedron as crystal morphology. On the other hand, clathrasil SGT is tetragonal and displays capped bipyramids as crystal morphology.

The preparation of template-free clathrasil is itself very complicated since removal of the template occurs only at temperatures of from 800 to 1000° C. and has to be carried out for a number of hours to weeks. It is also difficult to keep the zeolite structures intact at the high temperatures over the long reaction time.

In Angew. Chem. 1996, 108, No. 23/24, pages 3041 to 3044, Oberhagemann et al. disclose that sheet silicate structures can serve as zeolite precursors. For example, FER was obtained by simple heating of PREFER and MWW was obtained from MCM-22. Oberhagemann et al. assume that RUB-15 goes over into the zeolite sodalite on suitable temperature treatment. Unfortunately, this assumption that a pure temperature treatment of RUB-15 leads to sodalite has not been confirmed, as example 5 shows.

Topotactic condensations have also been described, for example, for the conversion of RUB-18 into RUB-24 (Marler et al.: The structure of the new pure silica zeolite RUB-24, obtained by topotactic condensation of the intercalated layer silicate RUB-18, Microporous and Mesoporous Materials 83 (2005) 201-211) or of octosilicate into RWR (Oumi et al.: Convenient conversion of crystalline layered silicate octosilicate into RWR-type zeolite by acetic acid intercalation, New Journal of Chemistry 31(2007), pp. 593-597). However, the zeolites obtained have rings having more than 6 linked $SiO_4$ tetrahedra and are thus not suitable for the separation task.

Compared to the use of clathrasils in powder form as absorbent, a clathrasil membrane offers the opportunity of separating molecules by means of a continuous process, which can prove to be of particular interest from both a technological point of view and an economic point of view.

SUMMARY

It was therefore an object of the present invention to provide a simplified process for the preparation of template-free clathrasils. A further object was to provide a clathrasil membrane and a process for producing this membrane.

DETAILED DESCRIPTION

We have surprisingly found a clathrasil whose framework comprises essentially $SiO_2$ and in which the crystals of the clathrasil do not correspond to the known morphology which is usually possible but have the pronounced platelet-like morphology of the sheet silicate from which the clathrasil is derived. These clathrasils can be prepared by a simple and inexpensive process as described below.

For the purposes of the present invention, the term "clathrasils" refers to zeolites which have rings having ≤6 $SiO_4$ tetrahedra linked via oxygen. The clathrasils SOD and AST have 6- and 4-membered rings, while the clathrasil SGT has 6-, 5- and 4-membered rings. For the purposes of the present invention, the term "clathrasils" accordingly does not refer to zeolites which have rings having >6 $SiO_4$ tetrahedra linked via oxygen, for example DDR (8-membered rings) or MFI (10-membered rings).

The usual crystal morphologies which occur in the classical direct hydrothermal synthesis of the following clathrasils are indicated below:
zeolite framework type SOD (cubic): cubes, octahedra, rhombododecahedra
zeolite framework type AST (cubic): octahedra
zeolite framework type SGT (tetragonal): capped bipyramids For the purposes of the present invention, the expression "essentially $SiO_2$" means that the framework of the clathrasil comprises exclusively $SiO_2$ and less than 0.1% by weight of impurities of further metals such as Al, B, Si, Be, Ge and Ga. In particular, no impurities of other metals can be detected.

The clathrasils produced from a sheet silicate preferably have a pronounced tabular or platelet-like crystal morphology. The platelets advantageously have a thickness of from 5 to 600 nm, in particular from 5 to 100 nm, a plate diameter of advantageously from 50 to 20 000 nm, in particular from 100 to 2000 nm, and a ratio of diameter to thickness which is advantageously in the range from 15 to 30.

Preferred clathrasils are the zeolite framework types SOD, AST, SGT or other clathrasils having a high proportion of 6-membered rings, in particular SOD and particularly preferably the SOD obtained from RUB-15.

The present invention further provides a process for preparing template-free clathrasils whose framework comprises essentially $SiO_2$ from sheet silicates, which comprises the following steps:
(i) replacement of the cations intercalated in the interlayers of the sheet silicates and, if present, at least part of the water of crystallization by at least one organic and polar, water-soluble compound,
(ii) thermal topotactic condensation of the sheet silicates exchanged with at least one organic compound to form clathrasils.

Step (i) is advantageously carried out at a temperature of from 0 to 100° C., preferably from 20 to 60° C. The pressure is advantageously from 1 to 2 bar absolute.

The reaction time for step (i) is typically from 1 hour to 2 days.

The organic compound is advantageously a polar, water-soluble substance from the group of amines, ethers, ketones, alcohols and acid amides and mixtures thereof. For example, it is possible to use ethylamine, polyfunctional aliphatic amines, dioxane, acetone, ethanol, ethylene glycol, formamide and preferably acids having a $C_1$ to $C_5$ chain, in particular acetic acid.

The organic compound is advantageously used in an aqueous mixture in a concentration of from 20 to 90 mol %, preferably 40-80 mol %. The amount based on the sheet silicate used should be such that an excess of organic compound of at least 1-100 on a molar basis per cation to be replaced is used. The concentration of acetic acid in the case of the replacement of the tetramethylammonium cation by acetic acid in RUB-15 is advantageously from 5 to 15 mol/l, preferably from 8 to 12 mol/l, in particular 10 mol/l.

As cations, preference is given to replacing tetramethylammonium, benzyltrimethyl-ammonium and alkali metal cations, for example $Na^+$.

Particular preference is given to using the sheet silicates RUB-15 and/or RUB-51 as SOD precursor and HLS as AST precursor.

RUB-15 comprises exclusively tetramethylammonium cations and water of crystallization, RUB-51 comprises exclusively benzyltrimethylammonium cations and no water of crystallization and helix-layered silicates (HLS) comprise exclusively tetramethylammonium and sodium cations and also water of crystallization in the interlayers. No sheet silicate precursor has hitherto been known for the clathrasil SGT.

Particular preference is given to the tetramethylammonium cations in RUB-15 being replaced by acetic acid in step (i), forming HOAc-RUB-15. Particular preference is given to replacing the benzyltrimethylammonium and sodium cations in RUB-51 by acetic acid in step (i), forming HOAc-RUB-51.

The synthesis of RUB-15, RUB-51 or HLS is generally known to those skilled in the art and is described, for example, by Oberhagemann et al. (Angew. Chem. 1996, 108, No. 23/24, 3041-3044) for RUB-15, by Gies et al. (Chem. Mater. 2008, 20, 1896-1901) for RUB-51 and by Ikeda et al. (Chem. Mater. 2001, 13, 1286-1295).

Step (ii) is advantageously carried out in air at a temperature of from 400 to 900° C., preferably from 500 to 600° C. The pressure is advantageously from 0 to 1 bar absolute.

The reaction time for step (ii) is typically from 1 to 8 hours.

The sheet silicates are preferably converted into SOD or AST zeolites; in particular, RUB-15 and/or RUB-51 is converted into SOD zeolites or HLS is converted into AST zeolites, and very particular preference is given to RUB-15 being converted into SOD (RUB-15-SOD).

The present invention further provides for the use of the template-free clathrasil of the invention as absorbent, as seed crystal for the synthesis of zeolite membranes or as membrane layer.

For example, the template-free clathrasils of the invention are used as absorbent for hydrogen in pressure swing adsorption either directly or after compounding/granulation with inorganic auxiliaries to produce larger particles. Furthermore, the template-free clathrasils of the invention can serve as seed crystals which, deposited on a support, are required for the classical secondary growth method of producing zeolite membranes. In addition, the template-free clathrasils of the invention can be used as membrane layer after deposition of the precursor on a support and topotactic transformation. Membrane layers are advantageously used in gas separation, vapor permeation or pervaporation. In the case of pervaporation, the feed is liquid and the permeate is gaseous.

Furthermore, the present invention provides a clathrasil membrane comprising a porous inorganic support and a membrane produced using clathrasil whose framework comprises essentially $SiO_2$, wherein the crystals of the clathrasil have the platelet-like morphology of a sheet silicate.

The supports advantageously have a body having pores which go right through the material and have a pore diameter in the range from 1 to 10 000 nm, preferably from 1 to 200 nm. The total proportion of the pore volume is advantageously greater than 20%, preferably greater than 30%.

The support can have all geometries known to those skilled in the art, for example tubular, flat, in the form of a disk, a plate or of fibers. The supports are preferably used in the form of flat disks having a diameter of up to 0.5 m, tubes having an internal or external diameter of 2-20 mm, capillaries having an internal or external diameter of 0.5-2 mm or in the form of multichannel elements which are used in the case of ceramic membranes for microfiltration or ultrafiltration.

Regardless of the geometric shape of the support, an asymmetric structure of the support, where this advantageously comprises, starting out from a base body, a plurality of successive layers, advantageously from 1 to 6 layers, having a decreasing pore diameter, with the smallest pore diameter being present on the side of the support to be provided with the separation layer, is advantageous. This smallest pore diameter is advantageously from 0.5 to 200 nm preferably from 1 to 100 nm. The thickness of the successive layers is advantageously from 10 nm to 50 000 nm, preferably from 100 to 10 000 nm.

Suitable materials for the support are many materials such as steels or oxide-ceramic materials such as the oxides aluminum oxide, zirconium oxide, titanium dioxide or mixtures of metal oxides comprising predominantly titanium dioxide. Further suitable support materials are magnesium oxide, silicon dioxide or other metal oxides, as long as they have a low solubility in water. In addition, carbides and nitrides, e.g. silicon carbide and silicon nitride, are also suitable, as long as they have a low solubility in water.

The clathrasil membrane of the invention advantageously has a thickness of from 200 nm to 100 000 nm, preferably from 500 to 50 000 nm.

Preference is given to using SOD and/or AST zeolites as clathrasils.

The present invention further provides a process for producing clathrasil membranes from clathrasil seed crystals which have been derived from a sheet silicate, which comprises the following steps:

(i) replacement of the cations intercalated in the interlayers of the sheet silicate crystals and, if present, at least part of the water of crystallization by at least one organic and polar, water-soluble compound, (ii) deposition of the sheet silicate crystals exchanged with at least one organic compound on an inorganic porous support, (iii) thermal topotactic condensation of the sheet silicate crystals exchanged with at least one organic compound to form clathrasil seed crystals, (iv) hydrothermal synthesis of a clathrasil membrane.

Step (i) in the process for producing clathrasil membranes is advantageously carried out in a manner analogous to step (i) for preparing template-free clathrasils, described on page 4, line 40 to page 5, line 32.

Furthermore, the same preferences in respect of sheet silicates and the organic compound as described on page 5 apply.

The sheet silicate crystals used in step (i) advantageously have a particle size of less than 2 μm, preferably less than 1 μm. In particular, the particle size is in the range from 50 to 500 nm. As a change to the details described in the literature for the preparation of sheet silicates, which generally lead to excessively large crystals, the crystal size can be optimized by means of influencing parameters known to those skilled in the art (e.g. concentration of reactants and auxiliaries, introduction of stirring energy).

Step (ii) can advantageously be carried out by filtering-on or attaching using polymeric quaternary ammonium compounds.

The preferences in respect of the inorganic porous supports are described on page 6, line 35 to page 7, line 20.

A suspension, preferably an aqueous suspension, comprising the sheet silicate crystals is advantageously brought into contact with the side of the support which is to be coated and the suspension comprising sheet silicate crystals is advantageously introduced into the pores of the support either as a result of application of a higher pressure to the side to be coated compared to the side not to be coated, as a result of application of a lower pressure to the side not to be coated or as a result of capillary suction generated by the pores. Here, the crystals accumulate on the side of the support to be coated as long as the particles are larger than the pores of the support.

The crystals can also advantageously be attached to the support by means of a suitable auxiliary. Preferred auxiliaries are monomeric or polymeric quaternary ammonium salts, for example poly-DADMAC (Redifloc®).

The deposition of crystals is advantageously carried out using an aqueous 0.05-1.0% strength by weight crystal suspension at room temperature and ambient pressure, optionally with the aid of a differential pressure over the support of up to 1 bar. The contact time with the suspension for the filtration onto the support and the attachment is from about 0.5 to 5 minutes.

After the deposition of crystals is complete, the flat supports are advantageously taken from the remaining suspension. If support tubes which are to be coated on the inside are used, the remaining suspension is advantageously drained at a velocity of from 0.1 to 10 cm/s.

The support with the deposited sheet silicate crystals is then advantageously dried in air at room temperature.

Step (iii) in the process for producing clathrasil membranes is carried out in a manner analogous to step (ii) for preparing template-free clathrasil, as described on page 5, lines 39, to page 6, line 4.

Step (iv), the hydrothermal synthesis, is generally known to those skilled in the art and is carried out in a manner analogous to the secondary growth method (see, for example, Caro et al.: zeolite membranes—recent developments and progress, Microporous and Mesoporous Materials 115 (2008) 215-233).

Preferred process conditions for step (iv) are temperatures in the range from 80 to 200° C. and a pressure in the range from 1 to 15 bar. The synthesis time can be in the range from 0.5 to 20 days.

The present invention further provides an alternative process for producing template-free clathrasil membranes from sheet silicate crystals, which comprises the following steps:

(i) replacement of the cations intercalated in the interlayers of the sheet silicate crystals and, if present, at least part of the water of crystallization by at least one organic and polar, water-soluble compound, (ii) deposition of the sheet silicate crystals exchanged with at least one organic compound on an inorganic porous support until a layer of sheet silicate crystals which covers the support has been formed, (iii) thermal topotactic condensation of the sheet silicate crystals exchanged with at least one organic compound in the deposited layer to give a clathrasil membrane.

Step (i) in the alternative process for producing clathrasil membranes is advantageously carried out in a manner analogous to step (i) for preparing template-free clathrasils, as described on page 4, line 40 to page 5, line 32.

In step (ii) it is advantageous to deposit a layer of sheet silicate crystals which has a thickness of from 200 to 100 000 nm, preferably from 500 to 50 000 nm, on the support.

Step (iii) in the alternative process for producing clathrasil membranes is advantageously carried out in a manner analogous to step (ii) for preparing template-free clathrasils, as described on page 5, line 39, to page 6, line 4.

Furthermore, the same preferences in respect of the sheet silicates and the organic compound as described on page 5 apply.

The clathrasils of the invention are advantageously used as adsorbent or in the form of membranes for separating hydrogen and/or ammonia and/or water from hydrocarbon mixtures comprising, for example, ethane/ethene, propane/propene, butane/butene or methane and/or benzene or from carbon monoxide and/or carbon dioxide. The use of the clathrasil membranes in combination with chemical reactions in which the equilibrium can be shifted in the direction of the desired product by separating off gases having a kinetic gas diameter of <0.3 nm ($H_2$, $NH_3$, $H_2O$) is particularly advantageous. The separation can be carried out from recycle gases which are recirculated to the reaction or directly in membrane reactors (catalytic reaction and separation in one apparatus). In principle, all gases having a kinetic gas diameter of <0.3 nm ($H_2$, $NH_3$, $H_2O$, He, Ne) can be separated off either alone or in admixture from gas mixtures whose components have kinetic gas diameters of >0.3 nm. The separation of hydrogen and/or ammonia and/or water is advantageously carried out at temperatures of from 50 to 800° C., preferably from 100 to 700° C., in particular from 200 to 600° C.

The present invention further provides a process for the extraction of gases having a kinetic gas diameter of <0.3 nm from gaseous and/or liquid mixtures, wherein the mixture is brought into contact with a clathrasil membrane.

Figure 1:
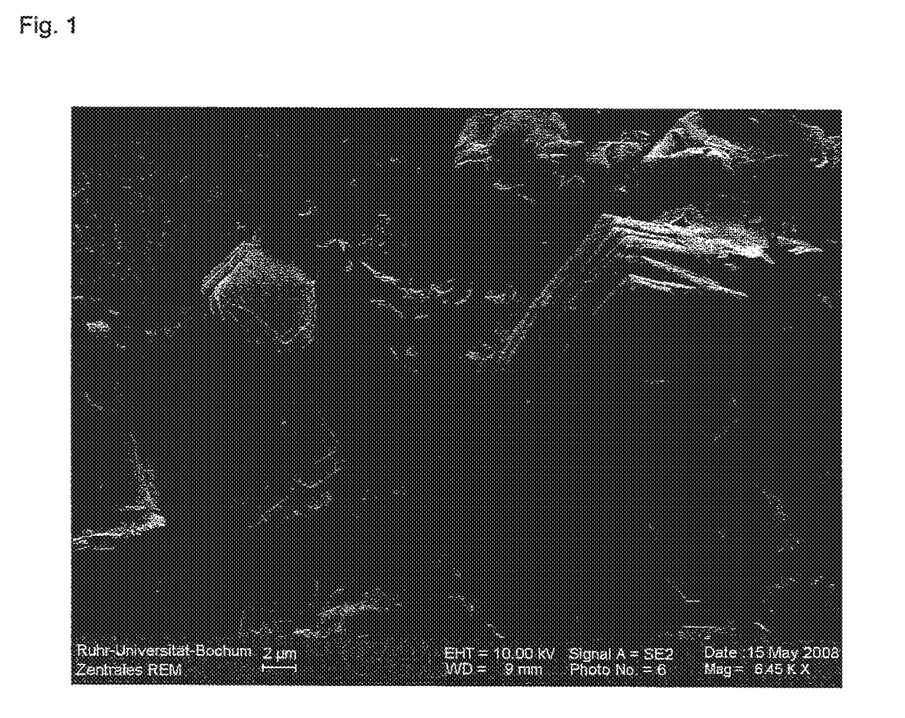
FIG. 1 shows the crystal morphology of a clathrasil according to an embodiment.
Figure 2:
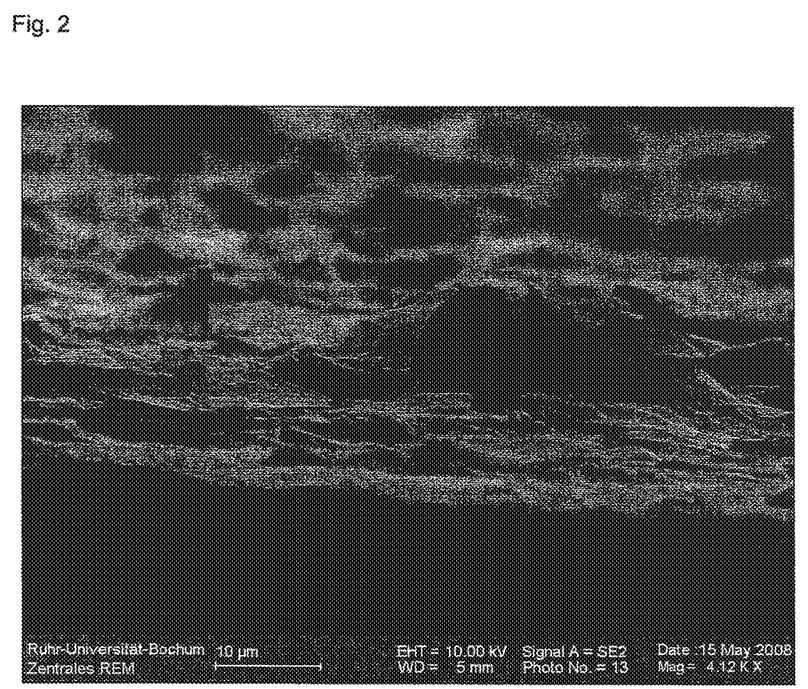
FIG. 2 shows the crystal morphology of a clathrasil according to an embodiment.
Figure 3:
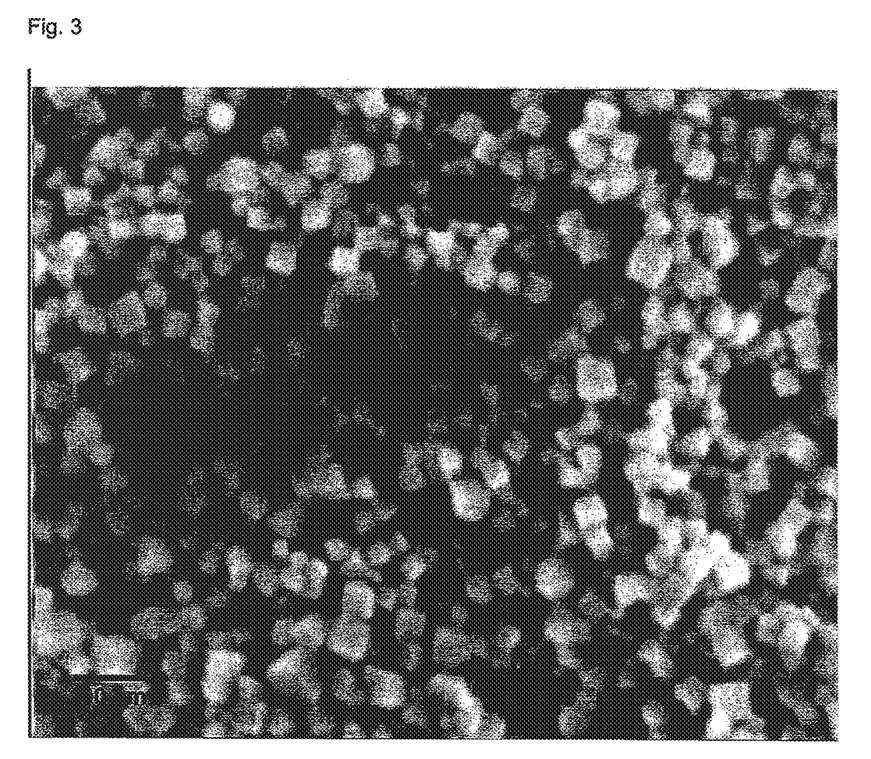
FIG. 3 shows the crystal morphology of a clathrasil according to the prior art.

In the present invention, it has for the first time been possible to prepare clathrasils which have a sheet silicate crystal morphology and can be used as seed crystal in the synthesis of clathrasil membranes. An advantage of this crystal morphology is short diffusion paths (platelet morphology) in the case of pressure swing adsorption. In the production of membranes by the alternative process, template-free membranes are formed directly at moderate production temperatures and template removal at significantly higher temperatures can be omitted. The crystal morphology of the clathrasils of the invention is shown in FIGS. 1 and 2. A typical crystal morphology of clathrasil from the prior art is shown in FIG. 3 (Münzer et al, Microporous and Mesoporous Materials 110 (2008) 3-10, FIG. 3).

EXAMPLES

1. Preparation of Template-Free SOD by (i) Replacement of the TMA$^+$ and the Water of Crystallization by Acetic Acid Molecules and (ii) Topotactic Condensation 1.1 Synthesis of the Sheet Silicate RUB-15:

The synthesis of the sheet silicate RUB-15 was carried out in accordance with the publication of Oberhagemann et al, (Oberhagemann, Bayat, Marler, Gies, Rius: Ein neuer Schichtsilikattyp: Synthese und Struktur des Zeolith-Precursers RUB-15, Angew. Chemie, 108, No. 23/24, 3041-3044, (1996)). 16 ml of TMAOH solution (25% by weight in $H_2O$) and 9.05 ml of tetramethoxysilane were used as synthesis mixture. A Teflon-lined steel autoclave with static synthesis conditions served as reaction vessel.

The synthesis time was 21 days, and the synthesis temperature was 140° C.

Figure 4:
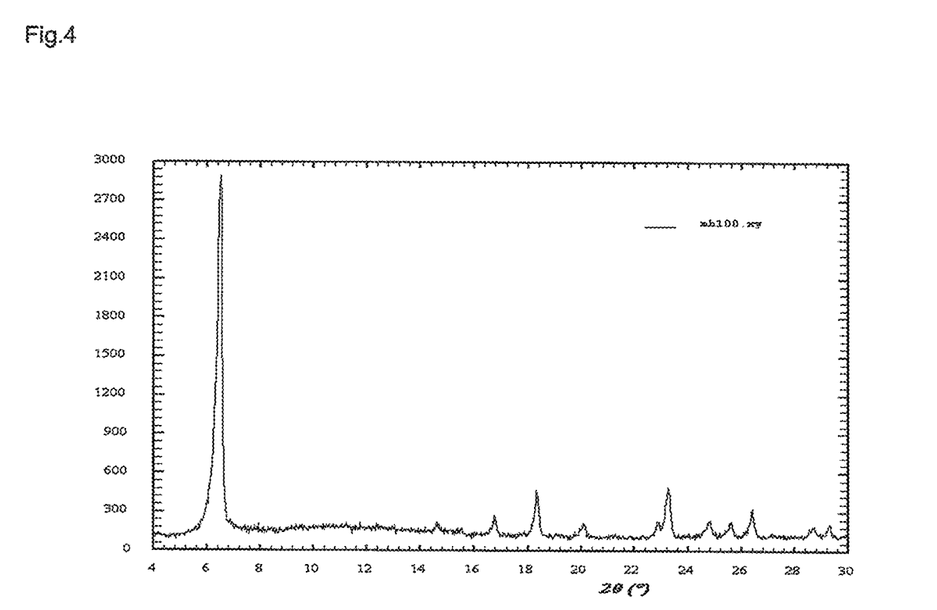
FIG. 4 is an x-ray diffraction powder pattern for a material according to the Examples.

The original X-ray powder pattern of the material obtained is depicted in FIG. 4.

1.2 Replacement of the TMA$^+$ and the Water of Crystallization by Acetic Acid Molecules:

A mixture of 300 mg of TMA-Rub-15 and 60 ml of 10 molar acetic acid were stirred at room temperature for 21 hours, the solid was subsequently centrifuged off and washed 3 times with distilled water and finally dried at 60° C. for 5 days.

Figure 5:
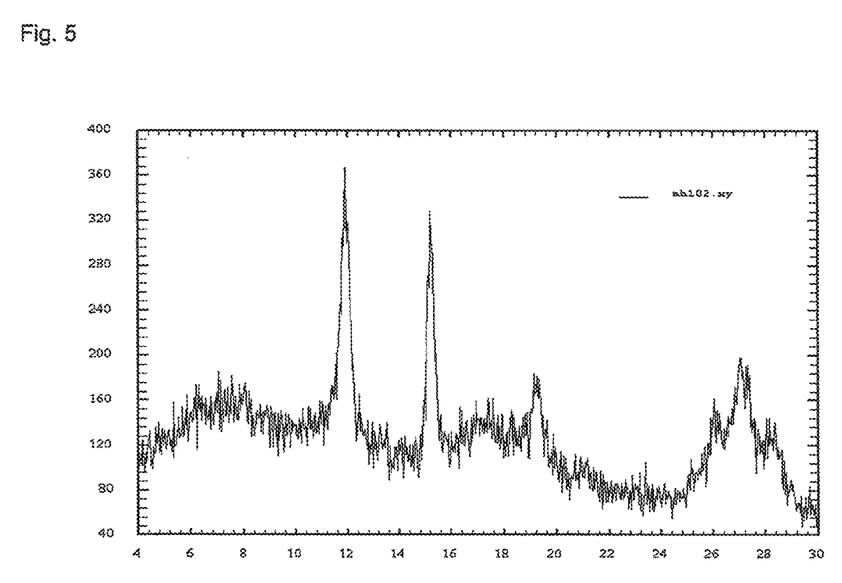
FIG. 5 is an x-ray diffraction powder pattern for a material according to the Examples.

The original X-ray powder pattern of the material obtained is depicted in FIG. 5.

1.3 Condensation of the Silicate Layers in RUB-15 Laden with Acetic Acid to Form Silica Sodalite:

The dried solid was heated at 10 K/min to 560° C. and maintained at 560° C. for 5 hours. During this treatment, the acetic acid was driven off from the material while the terminal silanol groups of adjacent silicate layers condensed to form Si—O—Si bonds. The porous framework silicate silica sodalite was formed in a form free of guest molecules.

Figure 6:
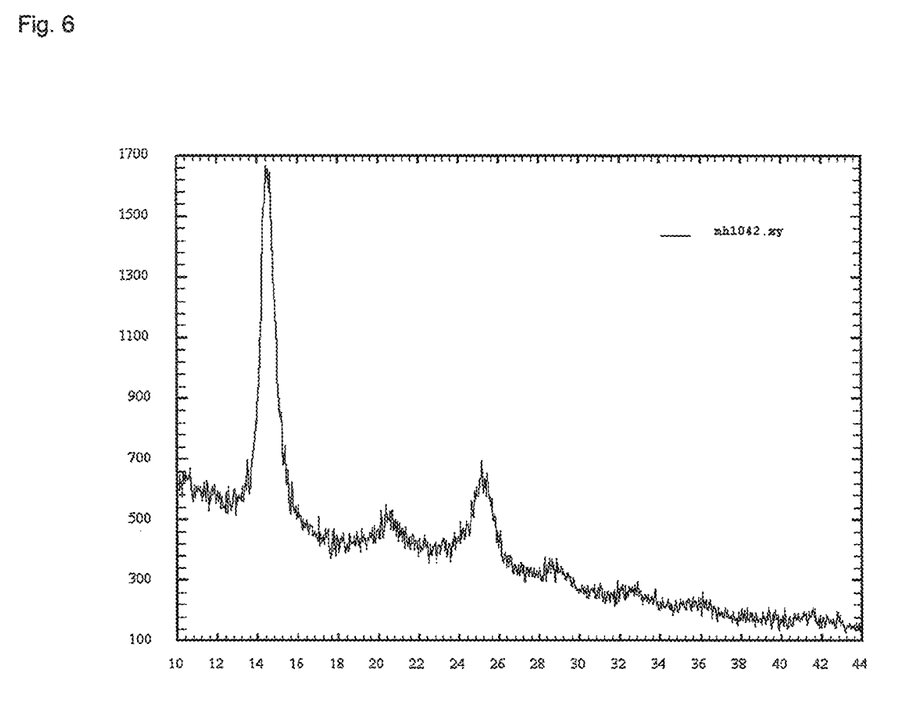
FIG. 6 is an x-ray diffraction powder pattern for a material according to the Examples.

The original X-ray powder pattern of the material obtained is depicted in FIG. 6.

2. Comparative Pattern of the SOD According to the Invention with the Prior Art In Table 1 below, the silica sodalite prepared in Example 1 is compared with a silica sodalite from the prior art. The agreement of the X-ray powder patterns is unambiguous.

TABLE 1

| Silica sodalite obtained by topotactic condensation from RUB-15 exchanged with acetic acid | | As-made silica sodalite (guest molecule: ethylenediamine): Braunbart et al. 1996. | | Simulated pattern of a cubic silica sodalite free of guest molecules | |
|---|---|---|---|---|---|
| d | I/I$_0$ | d | I/I$_0$ | d | I/I$_0$ |
| 6.17 | 100 | 6.26 | 71 | 6.231 | 100 |
| 4.34 | 15 | 4.426 | 41 | 4.406 | 12 |
| 3.53 | 30 | 3.614 | 100 | 3.598 | 39 |
| 3.10 | 0 | 3.130 | 16 | 3.116 | 10 |
| 2.71 | 5 | 2.800 | 15 | 2.787 | 9 |
| 2.51 | 5 | 2.577 | 18 | 2.544 | 11 |
| 2.19 | 5 | 2.215 | 5 | 2.203 | 4 | d = lattice plane spacing [Å]
I/I$_0$ = relative intensity

Ref.: C. M. Braunbarth, P. Behrens, J. Felsche, G. V. d. Goor, G. Wildermuth, G. Engelhardt, Zeolites 16 (1996) 207-217

3. Characterization of the Sodalite Obtained from the RUB-15 Precursor 0.3-0.4 g of the material obtained were activated at 250° C. under reduced pressure in a sorption balance for 4 hours and the weight increase at 25° C. with increasing gas pressure of nitrogen and hydrogen was then determined.

TABLE 2

| Gas pressure (bar) | N$_2$ absorption (mmol of N$_2$/g of SOD) | H$_2$ absorption (mmol of H$_2$/g of SOD) |
|---|---|---|
| 10 | 0.007 | 0.085 |
| 20 | <0.001 | 0.17 |
| 30 | 0.005 | 0.325 |
| 40 | −0.001 | 0.37 |
| 50 | −0.010 | 0.46 |
| 60 | −0.011 | 0.575 |

The data clearly show that the socialite prepared from RUB-15 absorbs hydrogen (kinetic gas diameter=0.289 nm) in the zeolite but does not absorb nitrogen (kinetic gas diameter=0.372 nm).

4. Preparation of Silica Sodalite Free of Guest Molecules by Condensation of RUB-15 Comprising Acetic Acid Replacement of the components tetramethylammonium and water present in TMA-RUB-15 by acetic acid molecules by stirring of solid TMA-RUB-15 in acetic acid in a manner analogous to Example 1.2 at various concentrations (and subsequent heating at 560° C.):

TABLE 3

| Concentration of the acetic acid used | Estimated proportion of silica sodalite in the product obtained |
|---|---|
| 5 molar | ca. 10% of silica sodalite |
| 8 molar | ca. 50% of silica sodalite |
| 10 molar | ca. 100% of silica sodalite |
| 13 molar | ca. 60% of silica sodalite |
| 17 molar | ca. 5% of silica sodalite |

Figure 7:
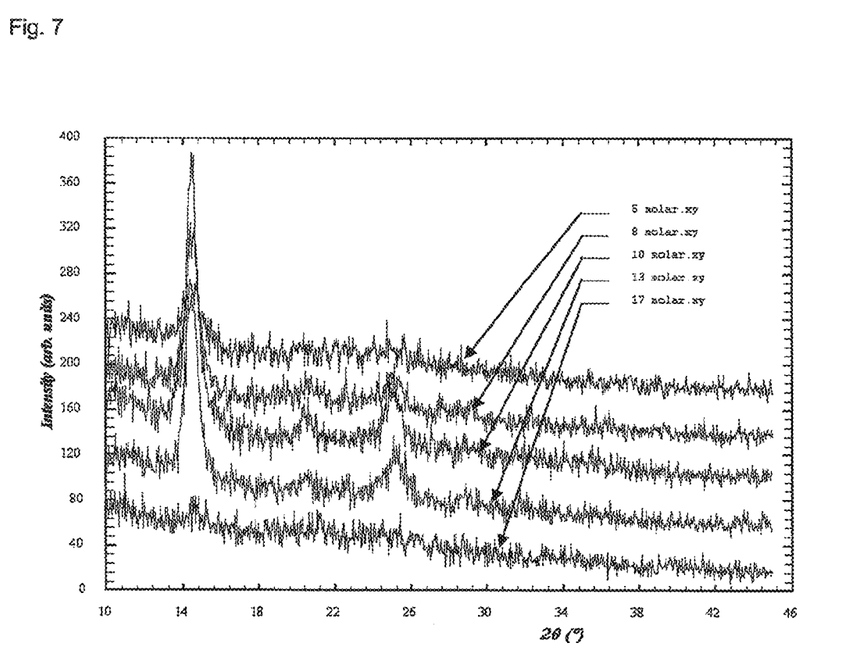
FIG. 7 is an x-ray diffraction powder pattern for a material according to the Examples.

The original X-ray powder patterns of the materials obtained are depicted in FIG. 7, with the graphs being shown with increasing acetic acid concentration from the top downward.

5. Pure Topotactic Condensation of the Sheet Silicate RUB-15

Sheet silicate RUB-15 was prepared as described in the publication by Oberhagemann et al. (see example 1.1) and part of the material was calcined at 560° C. for 5 hours.

Figure 8:
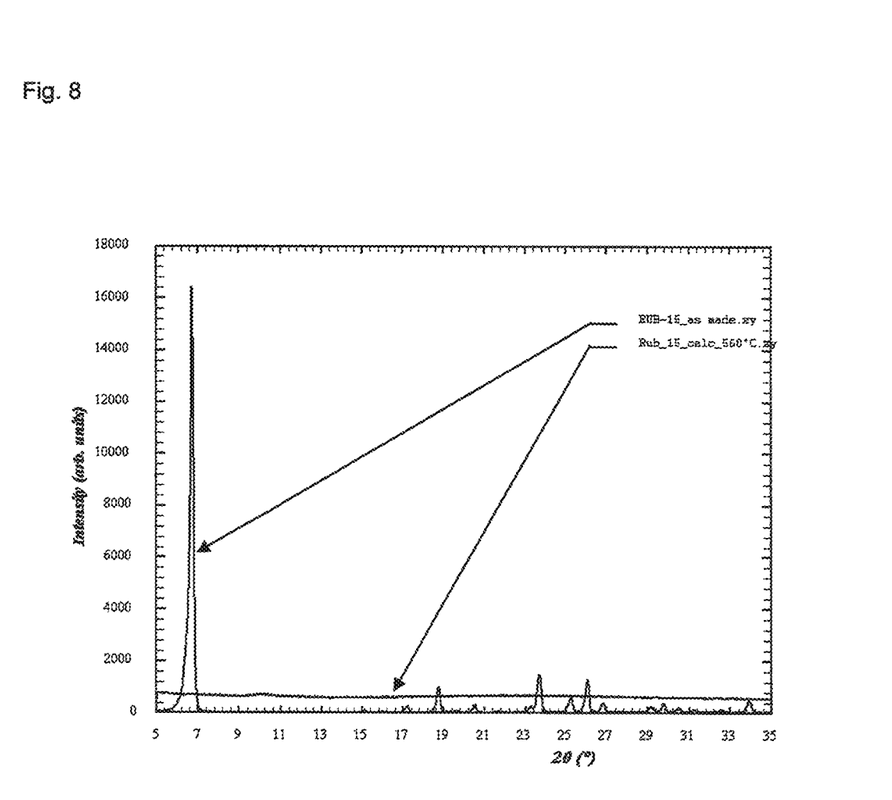
FIG. 8 is an x-ray diffraction powder pattern for a material according to the Examples.

X-ray diffraction patterns were recorded on the two materials, (i) RUB-15 ("as made") and (ii) calcined RUB-15 (calc. 560° C.), and these are shown in FIG. 8.

The pattern of RUB-15 ("as made") displays the typical peaks of the crystalline sheet silicate, while the pattern of the material RUB-15 (calc. 560° C.) prepared from RUB-15 ("as made") by calcinations displays the typical pattern of an amorphous substance.

Consequently, sodalite is not formed by simple heating of RUB-15 ("as made"), as assumed by Oberhagemann et al. in Angew. Chem. 1996, 108, No. 23/24, pages 3041 to 3044. Previous exchange of the tetramethylammonium cation (TMA$^+$) and the water of crystallization is thus essential to obtain sodalite by topotactic condensation.

We claim:

1. A template-free clathrasil whose framework comprises essentially SiO$_2$, wherein the crystals of the clathrasil have a platelet-like morphology of a sheet silicate, and wherein the clathrasil is template-free.

2. The template-free clathrasil according to claim 1, wherein the clathrasil is derived from a sheet silicate and has the platelet-like morphology of the sheet silicate from which the clathrasil is derived.

3. The template-free clathrasil according to claim 1, wherein the platelets have a thickness of from 5 to 100 nm.

4. The template-free clathrasil according to claim 1, wherein the platelets have a platelet diameter of from 80 to 2000 nm.

5. The template-free clathrasil according to claim 1, wherein the ratio of diameter to thickness of the platelets is from 15 to 30.

6. The template-free clathrasil according to claim 1, wherein the clathrasil is SOD, AST or SGT.

7. The template-free clathrasil according to claim 6, wherein the clathrasil is SOD obtained from RUB-15.

8. A process for preparing template-free clathrasils whose framework comprises essentially $SiO_2$ from sheet silicates, which comprises the following steps:
   (i) replacement of the cations intercalated in the interlayers of the sheet silicates and, if present, at least part of the water of crystallization by at least one organic and polar, water-soluble compound,
   (ii) thermal topotactic condensation of the sheet silicates exchanged with at least one organic compound to form clathrasils.

9. The process according to claim 8, wherein step (ii) is carried out at a temperature of from 400 to 900° C.

10. The process according to claim 8, wherein RUB-15, RUB-51, HLS, or combinations thereof are used as sheet silicates.

11. A method of using of a template-free clathrasil comprising providing the template-free clathrasil of claim 1 as an absorbent, as a seed crystal for the synthesis of zeolite membranes, or as a membrane layer.

12. A clathrasil membrane comprising at least one porous inorganic support and at least one membrane produced using the template-free clathrasil according to claim 1.

13. A process for producing clathrasil membranes from clathrasil seed crystals which have been derived from a sheet silicate, which comprises the following steps:
   (i) replacement of the cations intercalated in the interlayers of the sheet silicate crystals and, if present, at least part of the water of crystallization by at least one organic and polar, water-soluble compound,
   (ii) deposition of the sheet silicate crystals exchanged with at least one organic compound on an inorganic porous support,
   (iii) thermal topotactic condensation of the sheet silicate crystals exchanged with at least one organic compound to form clathrasil seed crystals,
   (iv) hydrothermal synthesis of a clathrasil membrane.

14. A process for producing template-free clathrasil membranes from sheet silicate crystals, which comprises the following steps:
   (i) replacement of the cations intercalated in the interlayers of the sheet silicate crystals and, if present, at least part of the water of crystallization by at least one organic and polar, water-soluble compound,
   (ii) deposition of the sheet silicate crystals exchanged with at least one organic compound on an inorganic porous support until a layer of sheet silicate crystals which covers the support has been formed,
   (iii) thermal topotactic condensation of the sheet silicate crystals exchanged with at least one organic compound in the deposited layer to give a clathrasil membrane.

15. A method of using a clathrasil membrane comprising providing the clathrasil membrane according to claim 12 for separating gases having a kinetic gas diameter of <0.3 nm from gas mixtures.

16. A process for the extraction of gases having a kinetic gas diameter of <0.3 nm from gaseous and/or liquid mixtures, wherein the mixture is brought into contact with the clathrasil membrane according to claim 12.

\* \* \* \* \*